P. GAETH.
GEARING.
APPLICATION FILED SEPT. 27, 1907. RENEWED DEC. 9, 1909.

957,763. Patented May 10, 1910.

WITNESSES:

Paul Gaeth
INVENTOR

BY
Attorneys

UNITED STATES PATENT OFFICE.

PAUL GAETH, OF CLEVELAND, OHIO.

GEARING.

957,763.  Specification of Letters Patent.  Patented May 10, 1910.

Application filed September 27, 1907, Serial No. 394,925. Renewed December 9, 1909. Serial No. 532,252.

*To all whom it may concern:*

Be it known that I, PAUL GAETH, citizen of the United States, residing at Cleveland, in the county of Cuyahoga and State of Ohio, have invented certain new and useful Improvements in Gearing, of which the following is a specification.

This application is a division of my pending application No. 367,179, filed April 9, 1907, and relates especially to the adjusting mechanism for the sparking igniter shown and claimed in said application.

The present invention is also applicable to any other kind of an igniter operated by a shaft.

The object of the present invention is to provide improved means for adjusting the operating shaft, so as to advance or retard the ignition.

Figure 1:
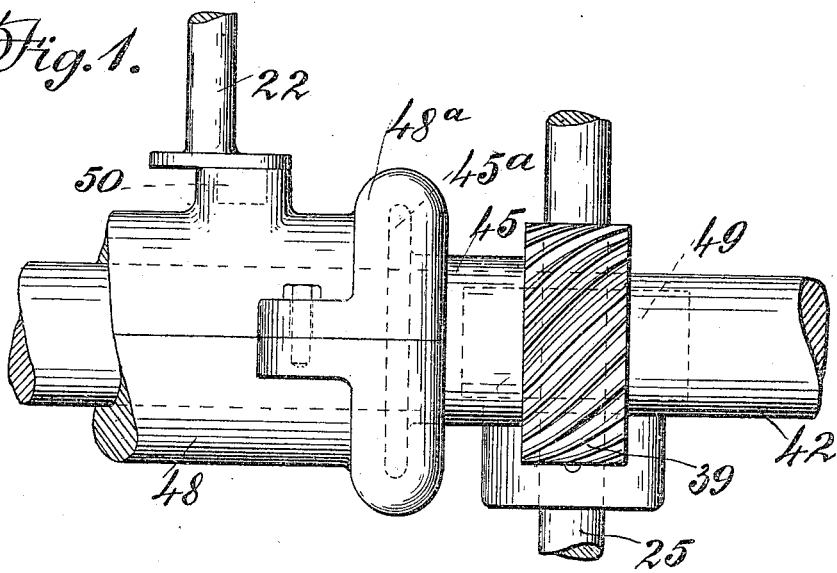
Figure 2:
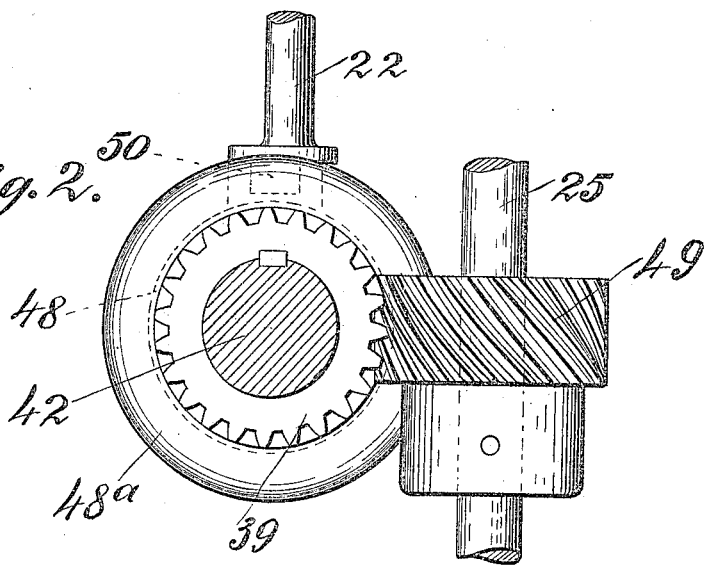

The invention is illustrated in the accompanying drawings, in which,

Figure 1 is a side view of the adjusting device. Fig. 2 is an end view thereof.

The operating shaft which is connected in any suitable manner to the igniters or make and break mechanism is indicated at 25, and this shaft may be set forward or back to advance or retard the spark. It carries a spiral gear 49 in mesh with a spiral gear 39 which is formed integral with a sleeve 45 having a collar 45$^a$ at the end. This sleeve, with the gear and collar, is slidable on the main valve or way-shaft 42 of the engine, the axis of which shaft extends to a right angle to that of the shaft 25.

The collar 45$^a$ is engaged in a groove on the inner side of an annular bead or boss 48$^a$ formed at the end of a split sleeve 48 which is movable along the cam shaft by means of a crank pin 50 projecting from a controlling shaft or turning rod 22 which may be extended to a position convenient for operation by the engineer or attendant.

By turning the rod 22 the split sleeve 48 will be moved one way or the other along the way shaft 42 carrying with it the spiral gear 39, and thereby turning the shaft 25 to vary the set of said shaft with respect to the stroke of the engine, and to advance or retard the operation of the sparkers accordingly. The gear 39 and sleeve 45 are keyed on the shaft 42 to rotate therewith, but have lengthwise movement for adjustment as stated. The sleeve 48 is loose on the shaft, which turns therein, and the collar is free to turn within the groove in the ring 48$^a$.

I claim:—

An adjusting mechanism comprising in combination, driving and driven shafts, and spiral gears between the same, a sleeve fixed to the gear on one shaft and slidable lengthwise on the shaft and having a collar at its end, a split sleeve also slidable on said shaft and having an internal groove in which said collar fits, and a turning rod having a crank pin engaging the split sleeve, to shift the same.

In testimony whereof I do affix my signature, in presence of two witnesses.

PAUL GAETH.

Witnesses:
T. L. PIERCE,
WILL C. BLATT.